United States Patent [19]

Evans et al.

[11] 4,149,140

[45] Apr. 10, 1979

[54] METHOD AND MEANS FOR DETECTING CHANGE IN TIRE PRESSURE

[76] Inventors: Ronald H. Evans, Rte. 1, Inola, Okla. 74036; Jon M. Miller, Hangar 1, Tulsa Intl. Airport, Tulsa, Okla.

[21] Appl. No.: 799,154

[22] Filed: May 23, 1977

[51] Int. Cl.² ............................................. B60C 23/00
[52] U.S. Cl. ..................... 340/58; 340/27 R; 340/510; 340/685; 73/65; 73/146
[58] Field of Search ............ 340/27 R, 58, 267 R, 340/267 C, 272, 285; 73/65, 88, 89, 90, 146, 146.2, 146.4, 146.5

[56] References Cited

U.S. PATENT DOCUMENTS

| 3,488,997 | 1/1970 | Kliever ........................ 73/65 |
| 3,620,074 | 11/1971 | Laimins et al. .............. 73/65 X |
| 3,625,053 | 12/1971 | Laimins ....................... 73/65 X |
| 3,900,828 | 8/1975 | Lage et al. ................... 340/27 R |

*Primary Examiner*—Alvin H. Waring

[57] ABSTRACT

A novel method is disclosed for determining the change in tire pressure of a dual wheel tire by detecting a change in the axle housing moment arm supported by the wheel assembly. The preferred apparatus for carrying out the invention comprises one or more strain gauges affixed to the axle housing adjacent the tire assemblies and electronic means for measuring the strain occurring as a result of the underinflated tire.

1 Claim, 3 Drawing Figures

U.S. Patent    Apr. 10, 1979    4,149,140
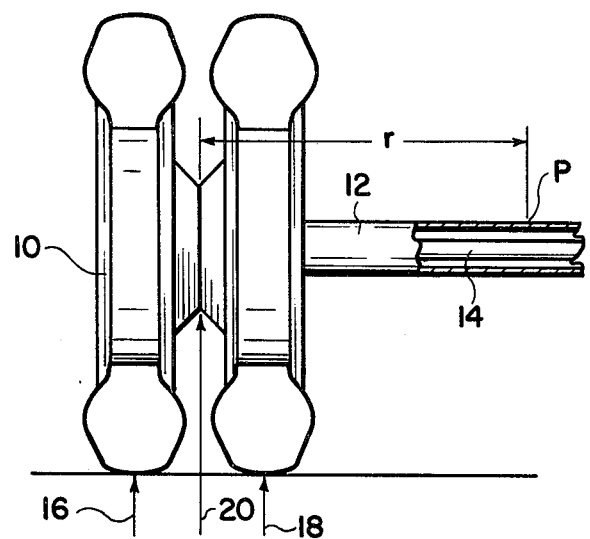
Fig. 1
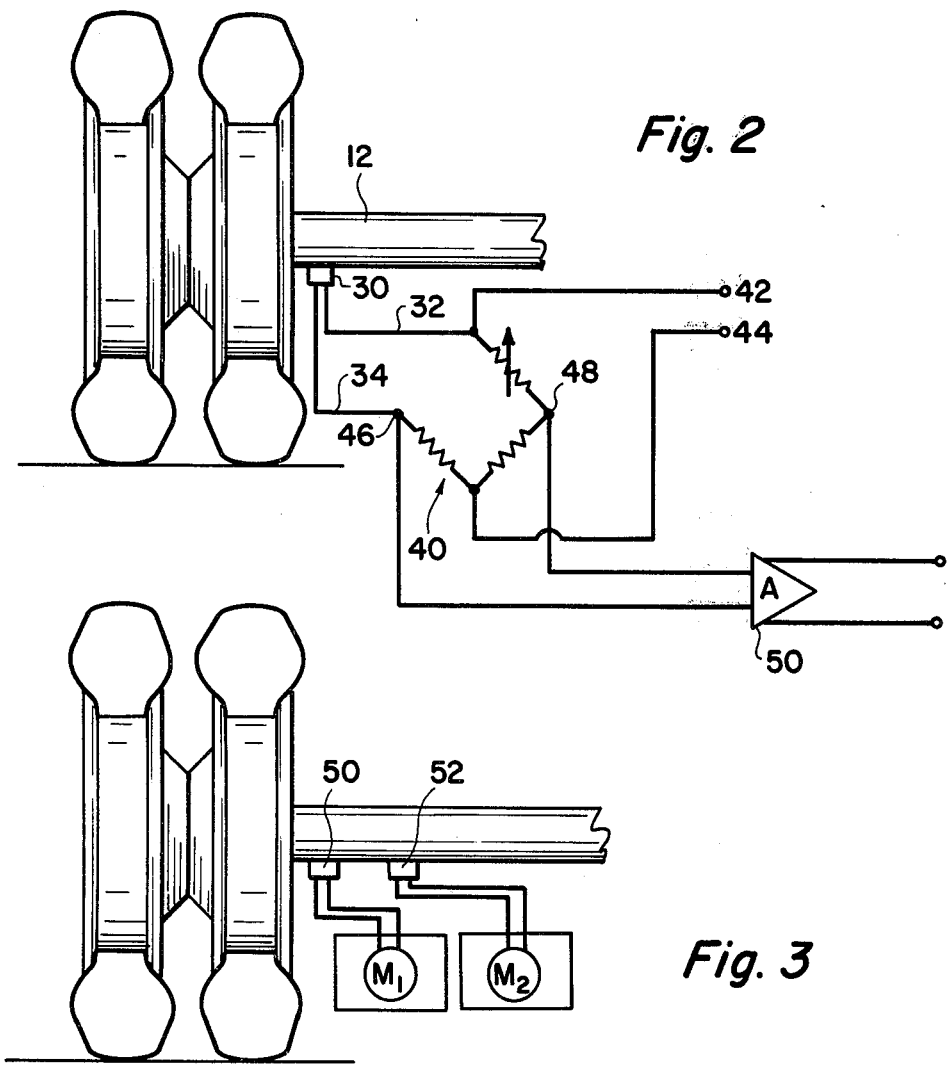
Fig. 2
Fig. 3

METHOD AND MEANS FOR DETECTING CHANGE IN TIRE PRESSURE

BACKGROUND OF THE INVENTION

1. Field of the Invention

This invention relates to a method and means for detecting an abnormally low tire pressure in a vehicle having dual wheel assemblies and alerting the driver of said condition.

2. Description of the Prior Art

The damaging effects of operating a dual wheeled road transport vehicle having an underinflated tire are well known. Driving with one of the tires flat for a relatively short distance will ruin the tire and possibly result in damage or failure of the properly inflated tire due to overheating or rubbing of the sidewalls. Unlike single wheeled vehicles, the underinflation of one of a pair of dual tires often passes unnoticed by the driver until the damage has occurred.

The high expense of tire losses and the potential hazards to the travelling public have caused many inventors to focus their attention on the problem. Numerous solutions in the prior art have revolved about direct monitoring of the pressure on each tire coupled with alarm systems. One such approach using miniature transmitters coupled to pressure detectors on each tire is disclosed in the U.S. Pat. No. 3,950,726 to Fujikawa et al, granted Apr. 13, 1976. Another approach using movable magnets, responsive to pneumatic pressure, for triggering an alarm is disclosed in the U.S. Pat. No. 3,978,448 to Vago, granted Aug. 31, 1976.

Such devices necessarily rely upon direct contact with the rotating tire or wheel. This reliance produces numerable difficulties in the ultimate signal conveyance or transmission.

Other devices, such as infrared detectors, mounted above the tires rely upon the heat generated by the underinflated tire. As heat is the primary enemy of the tire, this type of device often works too slow to prevent irreparable harm. Furthermore, the presence of mud or dirt on the sensing unit greatly interferes with the apparatus efficiency.

It is therefore an object of this invention to devise a method and means for detecting an abnormally low pressure in one tire of a dual wheel assembly, which does not rely upon direct contact with the tire. It is a further object of this invention to provide an effective system for alerting the driver prior to damage of the tire.

SUMMARY OF THE INVENTION

This invention contemplates a novel method and means for detecting and signalling the presence of an underinflated tire in a vehicle having dual tire assemblies which overcomes the deficiencies associated with the prior art solutions.

In a properly inflated dual tire assembly, each tire carries approximately one-half of the load on the assembly. The vertical ground forces on each dual tire assembly may thus be considered as a resultant single vertical force acting approximately midway between the tires. Deflation of one of the tires, however, shifts the resultant vertical force application in a horizontal direction towards the properly inflated tire, without a significant change in the vertical force magnitude. This shift in the resultant force application may be detected by detecting the change in moment of the axle housing carried by the dual tire assembly.

As a change in the supported axle housing moment produces a change in the axle housing stress, detection or measurement of the corresponding change in the axle housing strain provides a convenient method for detecting same.

A convenient means for measuring the change in the axle housing strain is to affix strain gauges directly to the axle housing. The effect on said gauges by a change in tire inflation is readily detectable through available electronic means and may be easily used for altering the driver.

BRIEF DESCRIPTION OF THE DRAWINGS

FIG. 1 is a simplified sectional elevation of a dual wheel assembly mounted on a floating axle housing.

FIG. 2 illustrates one preferred embodiment of the invention using one strain gauge per dual wheel assembly.

FIG. 3 illustrates the placement of a pair of strain gauges for a second preferred embodiment.

DESCRIPTION OF THE PREFERRED EMBODIMENTS

Referring to the drawings in detail and in particular to FIG. 1, there is shown a dual wheel assembly, generally indicated by reference numeral 10, which is typical of the assemblies used in nearly all commercial road transport vehicles. As depicted in the figure, the dual wheels are supported entirely by the axle housing 12. The axle shaft 14, which is positively, but not rigidly, connected to the wheel assembly, transmits torque only. With properly inflated tires, the ground forces on the wheel assembly 10, indicated by arrows 16 and 18, are directed vertically through each tire. The sum of these forces may be considered as a single vertical resultant force applied between the tires, as shown by arrow 20, having a magnitude equal to the algebraic sum of the magnitudes of forces 16 and 18. Application of the principles of elementary statics shows that the moment produced in the axle housing 12 at a given point, P, by the resultant ground force, neglecting the weight of the wheel assembly and axle, is equal to r x F, where r is the distance along the axle from the point of application of the resultant force to the given point, P, and F is the resultant ground force.

Should one of the tires become flat, the tire can no longer carry any load, and the point of application of the resultant ground force is shifted horizontally to the properly inflated tire, without significant change in the vertical force magnitude. Under such conditions, the moment in the axle housing will change due to the change in the length of the moment arm, r.

This charge in the axle housing moment may be readily detected since the moment directly affects the axle housing stress which produces a measurable strain. In one preferred embodiment of the invention, a strain gauge 30 is secured to the underside to axle housing 12 by any suitable means such as glue or epoxy as shown in FIG. 2. The strain gauge leads 32 and 34 are then electrically connected so that the gauge becomes one resistance arm of a conventional Wheatstone bridge, indicated by reference character 40. A source of potential is impressed across terminals 42 and 44 of the bridge circuit, and an amplifier 50 is connected to the bridge output terminals 46 and 48. Means (not shown) are also provided so that the bridge circuit may be nulled regardless of vehicle load. A change in the resistance of guage 30 reflecting a change in the axle housing strain due to an underinflated tires causes a current flow from the previously nulled bridge to amplifier 50. This current flow is amplified to the desired strength to activate a suitable warning light or audible signal for the vehicle driver.

In field testing this unit, a 120 Ω strain gauge was glued to the underside of the axle housing on an empty one-ton truck equipped with dual wheel assemblies. Even with the truck unloaded, 20 μ strain readings were consistently obtained upon simulated deflation of one of the tires.

Although a Wheatstone bridge circuit and amplifier were chosen as the preferred means for detecting and signalling the change in resistance of the strain gauge, it is apparent that while other electronic means might also suffice, the same would lie within the spirit and scope of the invention.

Driving some vehicles with the above detection system may give erroneous readings on sharp curves due to centrifugal force. A convenient means of alleviating such problems is to use a pair of strain gauges 50 and 52, attached to the axle housing at separate distances from the wheel assemblies as shown in FIG. 3. If $m_1$ and $m_2$ are the respective strain readings from gauges 50 and 52, the moment arm r, or distance along the axle housing to the resultant ground force, is seen to be equal to $$\frac{(a)(m_1)}{(m_2) - (m_1)},$$

where "a" is the distance separating the strain gauges. Suitable electronic means (not shown) may be used to compare the individual strain measurements for a direct readout of the moment arm or the same may be determined by the driver from observing separate readings.

It should be noted that the interposition of the vehicle load carried by the tire assembly between the strain gauge 50 and the tire assembly complicates the comparison equation somewhat but does not prevent determination of change in the moment arm.

Whereas the present invention has been described in particular relation to the drawings attached hereto, it should be understood that other and further modifications, apart from those shown or suggested herein, may be made within the spirit and scope of this invention.

What is claimed is:

1. Apparatus for detecting a change of pressure in one tire of a dual wheel assembly mounted to an axle housing by detecting a shift in the point of application of the resultant ground force transmitted by said dual wheel assembly to the axle housing, which comprises:

at least two strain gauges affixed to the axle housing adjacent said dual wheel assembly, but placed at separate distances therefrom;

means for detecting a change in resistance of each strain gauge; and means for comparing the change in resistance of each strain gauge in such a manner so as to determine a change in the point of application of the resultant ground force on the axle housing.

* * * * *